United States Patent
Jakobs et al.

(10) Patent No.: US 12,304,412 B2
(45) Date of Patent: May 20, 2025

(54) DEVICE FOR ACTIVATING/DEACTIVATING AN AIRBAG FUNCTION IN A VEHICLE

(71) Applicant: AUDI AG, Ingolstadt (DE)

(72) Inventors: Bernd Jakobs, Nuremberg (DE); Harald Krause, Ingolstadt (DE); Jörg Müller, Eitensheim (DE); Markus Prummer, Vohburg-Rockolding (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/535,035

(22) Filed: Dec. 11, 2023

(65) Prior Publication Data

US 2024/0270192 A1 Aug. 15, 2024

(30) Foreign Application Priority Data

Feb. 9, 2023 (DE) .......................... 102023103210.0

(51) Int. Cl.
*B60R 21/015* (2006.01)
*B60R 21/01* (2006.01)

(52) U.S. Cl.
CPC .... *B60R 21/0153* (2014.10); *B60R 21/01512* (2014.10); *B60R 21/01516* (2014.10); *B60R 21/01544* (2014.10); *B60R 21/01556* (2014.10); *B60R 2021/01013* (2013.01); *B60R 2021/01211* (2013.01)

(58) Field of Classification Search
CPC ............ B60R 22/48; B60R 2022/4825; B60R 2022/4866; B60R 2022/485; B60R 21/01546; B60R 2022/4816; B60R 22/03; B60R 21/0153; B60R 21/01544; B60R 21/01556; B60R 2021/01013;

(Continued)

(56) References Cited

U.S. PATENT DOCUMENTS 5,906,393 A * 5/1999 Mazur ................ G01G 19/4142
280/735
6,213,512 B1 * 4/2001 Swann .................... B60R 22/46
297/480

(Continued)

FOREIGN PATENT DOCUMENTS

DE 19932520 A1 2/2001
DE 10204134 A1 8/2003

(Continued)

OTHER PUBLICATIONS

Examination Report issued on Oct. 9, 2023, in corresponding German Application No. 102023103210.0, 8 pages.

*Primary Examiner* — Timothy Wilhelm
(74) *Attorney, Agent, or Firm* — Maier & Maier, PLLC

(57) ABSTRACT

A device for activating/deactivating an airbag function of an airbag assigned to a vehicle seat in a vehicle, having an identification system for occupant identification and having an evaluation unit, by which the occupant located on the vehicle seat is classifiable on the basis of the sensor data of the identification system. The evaluation unit activates or deactivates the airbag function in dependence on the occupant classification. The identification system has a plurality of different sensors, i.e., an interior sensor, an exterior sensor, a vehicle seat sensor, a belt sensor, a baggage compartment sensor, and/or a speech recognition sensor. The evaluation unit carries out the occupant classification on the basis of all sensor data.

16 Claims, 3 Drawing Sheets

(58) Field of Classification Search
CPC ..... B60R 2021/01211; B60R 21/01512; B60R 21/01516; B60R 2021/01184
See application file for complete search history.

(56) References Cited

U.S. PATENT DOCUMENTS

| | | | | |
|---|---|---|---|---|
| 6,282,473 | B1 * | 8/2001 | Steffens, Jr. ...... | B60R 21/01536 701/45 |
| 6,405,607 | B2 * | 6/2002 | Faigle .................... | B60N 2/267 73/862.391 |
| 7,268,704 | B2 * | 9/2007 | Schmied ........... | B60R 21/01566 341/20 |
| 7,717,215 | B2 * | 5/2010 | Tanaka .................... | B60R 22/46 280/806 |
| 7,761,207 | B2 * | 7/2010 | Midorikawa ........... | B60R 22/44 701/45 |
| 8,095,274 | B2 * | 1/2012 | Burkhardtsmaier ......................... B60R 21/01548 701/45 |  |
| 9,637,083 | B2 * | 5/2017 | Schlittenbauer ........ | B60R 22/02 |
| 9,676,356 | B2 * | 6/2017 | Ghannam ......... | B60R 21/01544 |
| 10,272,872 | B2 * | 4/2019 | Le ..................... | B60R 21/01548 |
| 10,953,850 | B1 * | 3/2021 | Pertsel .............. | B60R 21/01538 |
| 11,117,545 | B2 * | 9/2021 | Thomas .................. | B60R 22/48 |
| 11,167,719 | B2 * | 11/2021 | Song .................. | B60R 21/013 |
| 11,527,080 | B2 * | 12/2022 | Raj ........................ | G01S 13/42 |
| 11,603,060 | B2 * | 3/2023 | Thomas ............ | B60R 21/01536 |
| 11,691,586 | B2 * | 7/2023 | Fischer ................. | B60R 21/233 280/733 |
| 11,794,690 | B2 * | 10/2023 | Thomas ................ | B60R 25/305 |
| 11,884,232 | B2 * | 1/2024 | Gaither .................. | B60R 22/03 |
| 2006/0108154 | A1 * | 5/2006 | Mack ................ | B60R 21/01516 177/136 |
| 2018/0345893 | A1 * | 12/2018 | Imanaka ........... | B60R 21/01516 |
| 2020/0216005 | A1 * | 7/2020 | Stegmeier ......... | B60R 21/01548 |
| 2022/0212658 | A1 * | 7/2022 | Nagata ................ | G06V 40/172 |
| 2023/0047872 | A1 * | 2/2023 | Khamis ................ | B60N 2/0025 |

FOREIGN PATENT DOCUMENTS

| | | |
|---|---|---|
| DE | 10239761 A1 | 3/2004 |
| DE | 102017201965 A1 | 8/2018 |
| DE | 102018220043 A1 | 11/2019 |
| DE | 102019105675 A1 | 9/2020 |
| DE | 102021102814 A1 | 9/2021 |
| EP | 1262376 A1 | 12/2002 |
| EP | 2149478 A2 | 2/2010 |

* cited by examiner

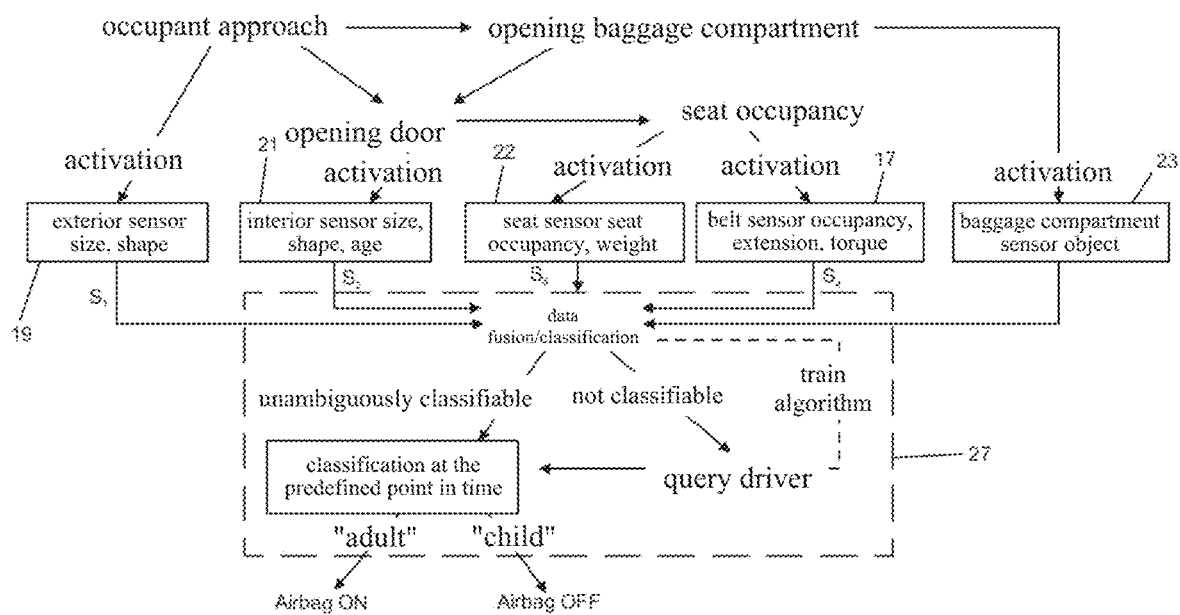

DEVICE FOR ACTIVATING/DEACTIVATING AN AIRBAG FUNCTION IN A VEHICLE

FIELD

The invention relates to a device for activating/deactivating an airbag function in a vehicle.

BACKGROUND

Restraint means, i.e., airbags and safety belts, are used in vehicles to protect the occupants adequately in an upright seated position in case of a crash. One requirement for avoiding injuries due to the airbag, in particular in children, can be met as follows: Upon identification of a child on the front passenger seat, a front passenger airbag is automatically deactivated. In contrast thereto, upon identification of an adult person on the front passenger seat, the airbag function of the front passenger airbag is activated to provide a restraint effect in case of a crash. A generic device for activating/deactivating an airbag function in a vehicle has an identification system for occupant identification and an evaluation unit. By means of the evaluation unit, the occupant on the vehicle seat is classifiable either as a child/child seat or as an adult person on the basis of the sensor data of the identification system. Upon classification of a child/child seat, the evaluation unit deactivates the airbag function. In contrast, the evaluation unit activates the airbag function if an adult person is classified.

In the prior art, the occupant identification is carried out, for example, by means of an image acquisition sensor, by means of a seat occupancy sensor or a force measuring bolt, due to which a misclassification can occur. Moreover, there is the following problem: In the prior art, the evaluation unit often carries out the occupant identification in dependence on the respective current occupant position on the passenger seat. A position change of the occupant that takes place during driving operation, for example, into a position "out of position" therefore can also result in a misclassification.

Such a generic device is known from DE 10 2019 105 675 A1, in which the person identification sensor is designed as an image acquisition sensor, which is coupled to an image evaluation unit to distinguish an adult and a child on the vehicle seat. An occupant classification system for triggering an airbag is known from EP 1 262 376 A1. A device is known from EP 2 149 478 A2, by means of which triggering of a so-called low risk deployment airbag is made possible in case of a crash.

SUMMARY

The object of the invention is to provide a device for activating/deactivating an airbag function in a vehicle, which operates with operational reliability in a simple manner in comparison to the prior art.

The invention relates to a device for activating/deactivating an airbag function in a vehicle. The device has an identification system for occupant identification and an evaluation unit. The evaluation unit executes a classification of the occupant positioned on the vehicle seat on the basis of the sensor data of the identification system. In dependence on the occupant classification, the evaluation unit activates or deactivates the airbag function of the airbag assigned to the vehicle seat as restraint means. According to the characterizing part of claim 1, a misclassification is prevented in a simple manner as follows: The identification system according to the invention not only has a single person identification sensor, but rather a plurality of different sensors. The evaluation unit carries out the occupant classification on the basis of the sensor data of all involved sensors. An interior sensor, an exterior sensor, a vehicle seat sensor, a belt sensor, a baggage compartment sensor, and/or a speech recognition sensor are preferably incorporated in the identification system, which have a single connection to a signal input of the evaluation unit. A data analysis and a data fusion take place in the evaluation unit on the basis of all sensor data, on the basis of which the evaluation unit performs the occupant classification in an operationally reliable manner.

In one preferred technical implementation, the vehicle occupant can be classified either as a child/child seat or as an adult position by means of the evaluation unit. The evaluation unit deactivates the airbag function if a child/child seat is classified. In contrast thereto, the evaluation unit activates the airbag function if an adult position is activated.

The evaluation unit can moreover be assigned a crash sensor, by means of which an imminent accident is detectable. Moreover, a risk assessment about the imminent accident severity can take place in the evaluation unit. If the accident severity determined in the evaluation unit exceeds a predefined threshold, the evaluation unit can activate the airbag function independently of the performed occupant classification. This is based on the substantive matter that the protective effect of the airbag always outweighs the potential injury due to the airbag from a certain accident severity.

According to the invention, the vehicle occupant is therefore unambiguously identifiable and classifiable by the evaluation unit. A further core concept of the invention is that the occupant protection required for the vehicle occupant is maintained during the entire driving operation, and independently of the current seat behavior of the vehicle occupant.

A further core concept of the invention proceeds from the substantive matter that in the prior art, the occupant classification carried out in the evaluation unit is adapted continuously to current sensor data of the identification system during the driving operation. That is to say, in the case of a current seat position of the vehicle occupant "out of position", the evaluation unit possibly performs an incorrect reclassification of the vehicle occupant. Such an incorrect reclassification can be avoided as follows according to the invention: The evaluation unit does not continuously carry out the occupant classification on the basis of current sensor data of the identification system. Rather, the evaluation unit only carries out the occupant classification once at a predefined point in time at the beginning of driving operation, for example, upon switching on the ignition, upon actuating the selector lever, or at a belt fastening point in time.

This is based on the concept that at least at the beginning of driving operation, the occupant assumes an upright, perfect seated position on the vehicle seat, which permits a correct occupant classification. According to the invention, the seating behavior of the vehicle occupant in the further course of driving operation remains without an effect on the occupant classification that has already been performed.

As mentioned above, according to the invention, the occupant classification remains unchanged during the entire driving operation after the predefined point in time. The evaluation unit can identify the continuing driving operation by means of sensors after the driving operation start. In particular, the evaluation unit identifies driving operation if the following conditions are met: vehicle door closed, safety belt applied, minimum vehicle velocity greater than a limiting value, vehicle acceleration data greater than a limiting value, and/or seat occupancy present.

In borderline cases, the evaluation unit cannot carry out a reliable occupant classification on the basis of the sensor data of the different sensors of the identification system. In this case, for example, at an HMI interface by text overlay, a query of the evaluation unit to the vehicle user is carried out with the prompt for user-side performance of an occupant classification.

In a further embodiment variant, the evaluation unit can be assigned a database in which the sensor data can be stored in conjunction with this user-side occupant classification. In this case, the evaluation unit can independently access the corresponding user-side occupant classification in the event of further driving operation with comparable sensor data, without again carrying out a query to the vehicle user.

BRIEF DESCRIPTION OF THE FIGURE(S)

An exemplary embodiment of the invention is described hereinafter on the basis of the appended figures.

In the figures:

FIG. 3 shows a flow chart to illustrate the invention.

DETAILED DESCRIPTION

Figure 1:
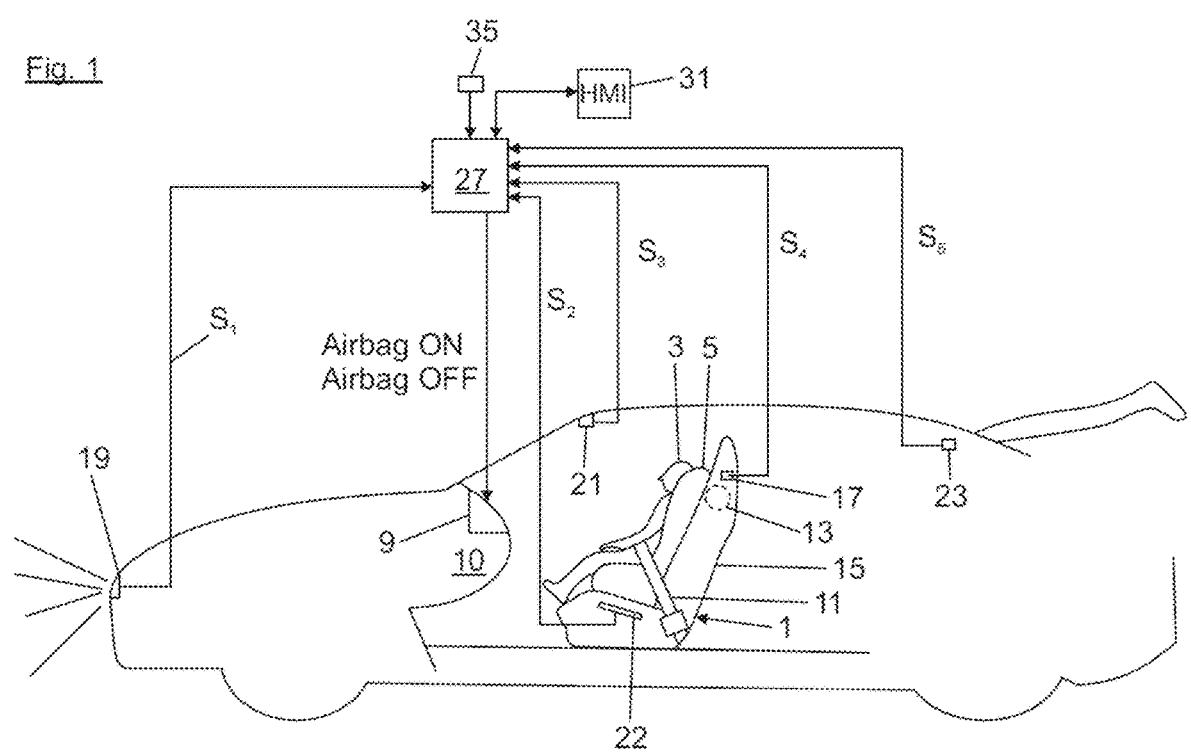
FIG. 1 shows a vehicle to illustrate the invention.

FIG. 1 indicates a vehicle to the extent necessary for understanding the invention. A vehicle occupant 3, who is in the present case a child 7 buckled onto a child seat 5, is located on the front passenger seat 1 of the vehicle. The vehicle has as restraint means a front passenger airbag 9 in the dashboard 10 and a three-point safety belt 11, the safety belt component of which is led to a belt tensioner 13, reversible by an electric motor, in the backrest 15 of the front passenger seat 1. The belt tensioner 13 has a belt sensor 17, using which a front passenger seat occupancy, a belt webbing extension, and an extension torque are detectable. Moreover, the vehicle has an exterior sensor 19, which detects the size and the body shape of persons approaching the vehicle, and an interior sensor 21, which detects the size, the body shape, and the age of vehicle occupants. Both the exterior sensor 19 and the interior sensor 21 are implemented as optical image acquisition sensors (camera, radar system). Furthermore, the vehicle has a baggage compartment sensor 23, which is also implemented as an optical image acquisition sensor and can identify objects, such as a stroller.

The belt sensor 17, the exterior sensor 19, the interior sensor 21, and the baggage compartment sensor 23 are parts of an identification system 25 for occupant identification. The identification system 25 can perform activation/deactivation of the front passenger airbag 9 together with an evaluation unit 27. For this purpose, the sensors 17, 19, 21, 22, 23 have a signal connection to the signal input of the evaluation unit 27. The evaluation unit 27 has by way of example a classification device 26 described hereinafter, a signal generating device 29, and a database 33 as program components in FIG. 2.

Data analysis and data fusion are carried out in the classification device 26 of the evaluation unit 27 on the basis of all sensor data $S_1$ to $S_5$ of all sensors 17 to 23. The evaluation unit 27 carries out the occupant classification on the basis of this data analysis and data fusion. That is to say, the evaluation unit 27 classifies the vehicle occupant 3 either as a child/child seat or as an adult position.

In the present case, the occupant 3 is classified as a child located in the child seat 5. Accordingly, a deactivation signal "airbag OFF" is generated in the signal generating unit 29 (FIG. 2) of the evaluation unit 27 in order to deactivate the airbag function. Vice versa, the signal generating unit 29 generates an activation signal "airbag ON", using which the airbag function is activated, upon classification of the vehicle occupant 3 as an adult position.

An essential core concept of the invention relates to the following substantive matter: The evaluation unit 27 carries out the data analysis/data fusion of all sensor data $S_1$ to $S_5$ only once at a predefined point in time at the beginning of driving operation, for example upon switching on the ignition, upon actuation of the selector lever, or at the point in time the belt is fastened. The occupant classification performed by the evaluation unit 27 remains unchanged after the predefined point in time during the entire driving operation until the end of driving operation. In this way, a change of the seat position of the vehicle occupant taking place after the predefined point in time remains without effect on the occupant classification. The seating behavior of the vehicle occupant during the driving operation therefore has no influence on the occupant classification.

In borderline cases, there is the problem that the evaluation unit 27 cannot carry out an unambiguous occupant classification on the basis of the sensor data $S_1$ to $S_5$. In this case, a query of the evaluation unit 27 to the vehicle user takes place with the request for the user to perform the occupant classification. For this purpose, the classification device 26 of the evaluation unit 27 in FIG. 1 or 2 has a signal connection to an HMI interface 31, in which the query is implemented, for example, as a text overlay by the vehicle user.

Figure 2:
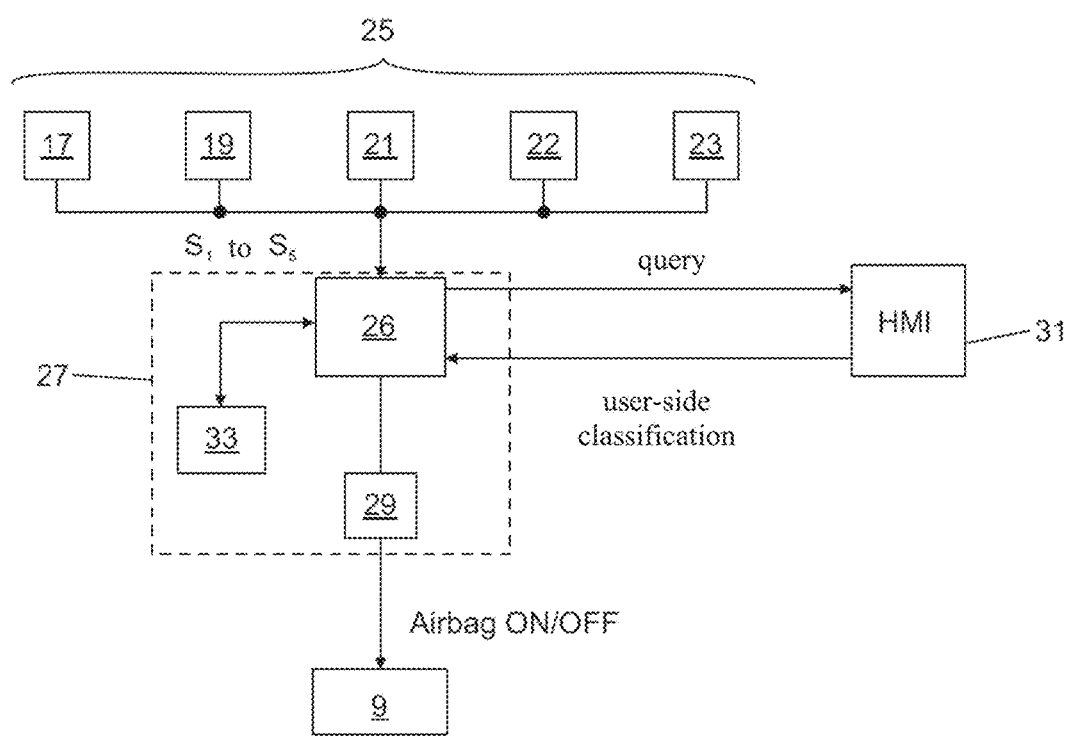
FIG. 2 shows a block diagram to illustrate the invention.

The classification device 26 of the evaluation unit 27 is moreover assigned the database 33 in FIG. 2, into which the sensor data $S_1$ to $S_5$ can be input in conjunction with the user-side occupant classification. Upon further driving operations having comparable sensor data $S_1$ to $S_5$, the corresponding user-side occupant classification which has been stored in the database 33 can be read automatically into the classification device 26, without again carrying out a query to the vehicle user.

Exemplary sequences for occupant identification and for deactivation/activation of the front passenger airbag 9 are indicated on the basis of the flow chart shown in FIG. 3. Accordingly, the exterior sensor 19 is activated upon an occupant approach. Moreover, a door is opened. If necessary, the baggage compartment is opened by the occupant, by which the baggage compartment sensor 23 is also activated. By opening a vehicle door, in the further sequence, the interior sensor 21, the seat sensor 22, and the belt sensor 17 are activated, after the vehicle occupant 3 has sat down on the vehicle seat 1. All sensors 17, 19, 21, 22, 23 generate corresponding sensor data $S_1$ to $S_5$, which are applied at the signal input of the evaluation unit 27. If an unambiguous classification can be carried out, the evaluation unit 27 defines an occupant classification at the predefined point in time. Alternatively thereto, in the event of a non-classifiable data situation, the vehicle user is requested to perform a user-side occupant classification. On this basis, the front passenger airbag 9 is activated upon a classification of an adult person in the flow chart of FIG. 3. Vice versa, the front passenger airbag 9 is deactivated upon a classification of a child.

For example, a first classification takes place upon a detection of the occupant 3 on the front passenger seat (with the aid of the seat sensor 22). This can be confirmed with a second classification which is carried out by the interior sensor 21 (camera, radar, UWB, or the like).

LIST OF REFERENCE SIGNS

1 front passenger seat
3 vehicle occupant
5 child seat
7 child
9 front passenger airbag
10 dashboard
11 safety belt
13 belt tensioner
15 backrest
17 belt sensor
19 exterior sensor
21 interior sensor
22 seat sensor
23 baggage compartment sensor
25 identification system
26 classification device
27 evaluation unit
29 signal generating device
31 HMI interface
33 database
25 crash sensor
$S_1$ to $S_5$ sensor data

The invention claimed is:

1. A device for activating/deactivating an airbag function of an airbag assigned to a vehicle seat in a vehicle, the device comprising:
 an identification system for identification of an occupant of the vehicle and having an evaluation unit, by which the occupant located on the vehicle seat is classifiable on the basis of sensor data of the identification system, wherein the evaluation unit activates or deactivates the airbag function in dependence on the occupant classification, the identification system has a plurality of different sensors, including an interior sensor, an exterior sensor, a seat sensor, a belt sensor, and a baggage compartment sensor, and the evaluation unit carries out the occupant classification one time on the basis of all sensor data from the plurality of different sensors at a predefined point in time at the beginning of a driving operation and the occupant classification remains unchanged during the driving operation after the predefined point in time.

2. The device as claimed in claim 1, wherein the vehicle occupant is classifiable either as a child/child seat or as an adult person by the evaluation unit, and the evaluation unit either deactivates the airbag function upon classification of the child/child seat or activates the airbag function upon classification of the adult person.

3. The device as claimed in claim 2, wherein the evaluation unit is assigned a crash sensor, by which an imminent accident and its accident severity is detectable, and the evaluation unit activates the airbag function independently of the performed occupant classification after the detected accident severity exceeds a predefined threshold.

4. The device as claimed in claim 1, wherein the evaluation unit is assigned a crash sensor, by which an imminent accident and its accident severity is detectable, and the evaluation unit activates the airbag function independently of the performed occupant classification after the detected accident severity exceeds a predefined threshold.

5. The device of claim 1, wherein the belt sensor is located in a belt tensioner of a three-point safety belt.

6. The device of claim 1, wherein the exterior sensor is configured to detect size and body shape of persons approaching the vehicle.

7. The device of claim 1, wherein the interior sensor is configured to detect size, body shape, and age of each occupant of the vehicle.

8. The device of claim 1, wherein the exterior sensor and the interior sensor are both implemented as optical image acquisition sensors.

9. The device of claim 1, wherein the baggage compartment sensor is implemented as an optical image acquisition sensor and configured to identify a stroller.

10. The device of claim 1, wherein the seat sensor is configured to activate after the occupant of the vehicle has sat down on a vehicle seat.

11. A device for activating/deactivating an airbag function of an airbag, assigned to a vehicle seat, in a vehicle, comprising:
 an identification system for occupant identification and having an evaluation unit, by which the occupant located on the vehicle seat is classifiable on the basis of sensor data of the identification system, wherein the evaluation unit activates or deactivates the airbag function in dependence on the occupant classification, the identification system has a plurality of different sensors, including an interior sensor, an exterior sensor, a vehicle seat sensor, a belt sensor, and a baggage compartment sensor, the evaluation unit carries out the occupant classification one time on the basis of all sensor data from the plurality of different sensors at a predefined point in time at the beginning of a driving operation and the occupant classification remains unchanged during the driving operation after the predefined point in time.

12. The device as claimed in claim 11, wherein the occupant classification performed by the evaluation unit remains unchanged until the end of driving operation, so that a change of the seat position of the occupant taking place after the predefined point in time is without effect on the occupant classification.

13. The device as claimed in claim 12, wherein the evaluation unit detects the continuing driving operation by sensors after the following conditions are met:
 vehicle door closed,
 safety belt applied,
 minimum vehicle velocity greater than a limiting value,
 vehicle acceleration data greater than a limiting value, and/or
 seat occupancy exists.

14. The device as claimed in claim 11, wherein the evaluation unit detects the continuing driving operation by sensors after the following conditions are met:
 vehicle door closed,
 safety belt applied,
 minimum vehicle velocity greater than a limiting value,
 vehicle acceleration data greater than a limiting value, and/or
 seat occupancy exists.

15. A device for activating an airbag function of an airbag, assigned to a vehicle seat, in a vehicle, comprising:
 an identification system for occupant identification and having an evaluation unit, by which the occupant located on the vehicle seat is classifiable on the basis of sensor data of the identification system, wherein the evaluation unit activates or deactivates the airbag function in dependence on the occupant classification, after an unambiguous occupant classification cannot be carried out on the basis of the sensor data, a query of the evaluation unit to the vehicle user takes place with the prompt for the user to perform an occupant classification, and the evaluation unit carries out the occupant classification one time on the basis of all sensor data from the plurality of different sensors, the plurality of different sensors including an interior sensor, an exterior sensor, a seat sensor, a belt sensor, and a baggage compartment sensor, at a predefined point in time at the beginning of a driving operation and the occupant classification remains unchanged during the driving operation after the predefined point in time.

16. The device as claimed in claim 15, wherein the evaluation unit is assigned a database, in which the sensor data can be stored in conjunction with the user-side occupant classification, and the evaluation unit, upon further driving operations having comparable sensor data, independently accesses the corresponding user-side occupant classification without again carrying out a query of the vehicle user.

* * * * *